US011113257B2

(12) United States Patent
Agarwal et al.

(10) Patent No.: US 11,113,257 B2
(45) Date of Patent: Sep. 7, 2021

(54) SYSTEM AND METHOD OF MANAGING KEY ENTITY RECORDS

(71) Applicant: Innoplexus AG, Eschborn (DE)

(72) Inventors: Vatsal Agarwal, Rampur (IN); Dileep Dharma, Pune (IN); Esha Pandita, Aligarh (IN)

(73) Assignee: Innoplexus AG, Eschborn (DE)

( * ) Notice: Subject to any disclaimer, the term of this patent is extended or adjusted under 35 U.S.C. 154(b) by 240 days.

(21) Appl. No.: 16/366,675

(22) Filed: Mar. 27, 2019

(65) Prior Publication Data

US 2020/0089668 A1    Mar. 19, 2020

(30) Foreign Application Priority Data

Mar. 27, 2018  (GB) ..................................... 1804936

(51) Int. Cl.
*G06F 12/00* (2006.01)
*G06F 16/00* (2019.01)
*G06F 16/22* (2019.01)
*G06F 16/28* (2019.01)
*G06F 16/21* (2019.01)
*G06F 16/2457* (2019.01)

(52) U.S. Cl.
CPC ........ *G06F 16/2282* (2019.01); *G06F 16/211* (2019.01); *G06F 16/24578* (2019.01); *G06F 16/285* (2019.01)

(58) Field of Classification Search
None
See application file for complete search history.

(56) References Cited

U.S. PATENT DOCUMENTS

| 2010/0005056 A1* | 1/2010 | Bayliss | G06F 16/24578 707/E17.005 |
| 2012/0023107 A1* | 1/2012 | Nachnani | G06F 16/24532 707/748 |
| 2015/0026604 A1* | 1/2015 | Mulukuri | H04L 51/32 715/758 |

* cited by examiner

*Primary Examiner* — Tuan A Pham
(74) *Attorney, Agent, or Firm* — Ziegler IP Law Group, LLC

(57) ABSTRACT

A system of managing key entity records required by a user. The system includes a database arrangement operable to store a structured database including entity records and a processing module communicably coupled to the database arrangement. The processing module is operable to receive the structured database including entity records; determine an importance score for each of the entity records; identify key entity records based on the determined importance scores of the entity records; receive a tuning-input from the user; calculate a tuned importance score for each of the entity records based on the tuning-input from the user; and identify the key entity records required by the user based on the tuned importance scores of the entity records.

9 Claims, 2 Drawing Sheets

SYSTEM AND METHOD OF MANAGING KEY ENTITY RECORDS

CROSS-REFERENCE TO RELATED APPLICATIONS

This application claims the benefit under 35 U.S.C. § 119(a) and 37 CFR § 1.55 to UK Patent Application No. GB1804936.1, filed on Mar. 27, 2018, the entire content of which is incorporated herein by reference.

TECHNICAL FIELD

The present disclosure relates generally to identifying influential entities; and more specifically, to systems that manages key entity records required by a user. Furthermore, the present disclosure relates to methods of managing key entity records required by a user. Moreover, the present disclosure also relates to computer readable medium containing program instructions for execution on a computer system, which when executed by a computer, cause the computer to perform method steps of managing key entity records required by a user

BACKGROUND

Generally, with advancement in technology, there has been a gradual increase in terms of development of new services. For example, such services may include launch or development of a new product, research work and so forth.

Furthermore, guidance is required for the development of product and successful launch of any product or service. Moreover, such guidance may be provided by entities that may hold an experience and influence over such developments and launches. Furthermore, key entities in a certain field may include top influential leaders, companies and so forth of such field. Moreover, the key entities may relate to a specific field of interest based on the industry requirements. For example, a pharmaceutical company requires different health care professionals at different stages of drug life cycle for different drugs. Similarly, a telecom firm may require different types of professionals at various stages in the life of any product for marketing.

Conventionally, the key entities may be identified using surveys, literature searches, nominations and so forth. Furthermore, the data for such analysis may be acquired from publicly available data sources such as social networking sites, blogs, news, institutes, profiles, literature database and so forth. Moreover, the data for such analysis is required to be maintained manually. Furthermore, the data may be arranged as an entity record. Furthermore, the entity records may include entity names and entity attributes (such as, information) associated with the entity names. Moreover, the entity attributes may be associated with each other in a way to provide additional information related to the specific field of interest.

Furthermore, the influential entities may be selected based on their associations relevant to the specific domain of user's interest. For example, when a product is a pharmaceutical drug, a medical professional may be selected as an influential entity for the purpose of influencing the public regarding the issued drug. However, such extraction of influential entities requires manual maintenance and may not be regularly updated. This may further make the process of identification and managing of influential entities more time-critical and biased. Furthermore, a delay in the process of identifying latest relevant associations associated with the influential entities in the specific domain of user's interest may also be expected. Additionally, there is no provision of real time influential entity records for manifestation of the individual search according to the contemporary requirement and conditions of the user.

Therefore, in light of the foregoing discussion, there exists a need to overcome the aforementioned drawbacks associated with conventional methods of identification of entities required by the user.

SUMMARY

The present disclosure seeks to provide a system that manages key entity records required by a user. The present disclosure also seeks to provide a method of managing key entity records required by a user. The present disclosure also seeks to provide a computer readable medium, containing program instructions for execution on a computer system, which when executed by a computer, cause the computer to perform method steps managing key entity records required by a user. The present disclosure seeks to provide a solution to the existing problem of non-customizable identification of entities irrelevant to field of interest of the user. An aim of the present disclosure is to provide a solution that overcomes at least partially the problems encountered in prior art, and provides a simple, optimal and reliable solution for managing key influential entities in specific domains of the industry.

In one aspect, an embodiment of the present disclosure provides a system that manages key entity records required by a user, wherein the system includes a computer system, wherein the system comprises:
  a database arrangement operable to store a structured database comprising entity records; and
  a processing module communicably coupled to the database arrangement, the processing module operable to:
  receive the structured database comprising entity records, wherein each of the entity records comprises an entity name and plurality of entity attributes, further wherein the plurality of entity attributes belong to asset classes;
  determine an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record;
  identify key entity records based on the determined importance scores of the entity records;
  receive a tuning-input from the user, wherein the tuning-input is operable to adjust at least one of the contribution metrics corresponding to the asset classes;
  calculate a tuned importance score for each of the entity records based on the tuning-input from the user; and
  identify the key entity records required by the user based on the tuned importance scores of the entity records.

In another aspect, an embodiment of the present disclosure provides a method of managing key entity records required by a user, wherein the method includes using a computer system, wherein the method includes using a computer system, wherein the method comprises:
  providing a structured database comprising entity records, wherein each of the entity records comprises an entity name and plurality of entity attributes, further wherein the plurality of entity attributes belong to asset classes;

determining an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record;

identifying key entity records based on the determined importance scores of the entity records;

receiving a tuning-input from the user, wherein the tuning-input is operable to adjust at least one of the contribution metrics corresponding to the asset classes;

calculating a tuned importance score for each of the entity records based on the tuning-input from the user; and identifying the key entity records required by the user based on the tuned importance scores of the entity records.

In yet another aspect, an embodiment of the present disclosure provides a computer readable medium, containing program instructions for execution on a computer system, which when executed by a computer, cause the computer to perform method steps for managing key entity records required by a user, the method comprising the steps of:

providing a structured database comprising entity records, wherein each of the entity records comprises an entity name and plurality of entity attributes, further wherein the plurality of entity attributes belong to asset classes;

determining an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record;

identifying key entity records based on the determined importance scores of the entity records;

receiving a tuning-input from the user, wherein the tuning-input is operable to adjust at least one of the contribution metrics corresponding to the asset classes;

calculating a tuned importance score for each of the entity records based on the tuning-input from the user; and identifying the key entity records required by the user based on the tuned importance scores of the entity records.

Embodiments of the present disclosure substantially eliminate or at least partially address the aforementioned problems in the prior art, and enables a user-adjustable identification of entity records and provides results relevant to the field of interest of the user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
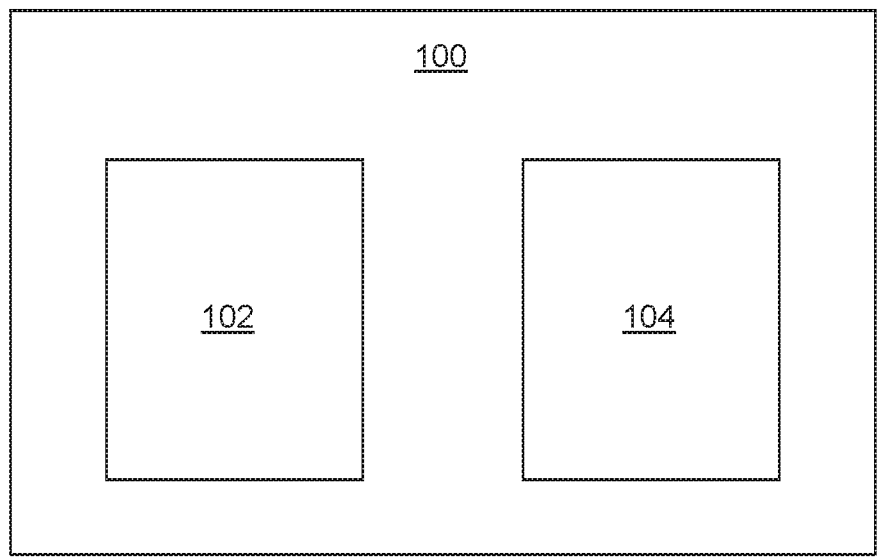
FIG. 1 is a block diagram of a system that manages key entity records required by a user, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with identifying key entity records and specifically to, determining relevant key entity records for a user based on an input therefrom.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system that manages the system, wherein the system includes a computer system, comprises:

a database arrangement operable to store a structured database comprising entity records; and a processing module communicably coupled to the database arrangement, the processing module operable to:

receive the structured database comprising entity records, wherein each of the entity records comprises an entity name and plurality of entity attributes, further wherein the plurality of entity attributes belong to asset classes;

determine an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record;

identify key entity records based on the determined importance scores of the entity records;

receive a tuning-input from the user, wherein the tuning-input is operable to adjust at least one of the contribution metrics corresponding to the asset classes;

calculate a tuned importance score for each of the entity records based on the tuning-input from the user; and identify the key entity records required by the user based on the tuned importance scores of the entity records.

In another aspect, an embodiment of the present disclosure provides a method of managing key entity records required by a user, wherein the method includes using a computer system, characterized in that the method comprises:

- providing a structured database comprising entity records, wherein each of the entity records comprises an entity name and plurality of entity attributes, further wherein the plurality of entity attributes belong to asset classes;
- determining an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record;
- identifying key entity records based on the determined importance scores of the entity records;
- receiving a tuning-input from the user, wherein the tuning-input is operable to adjust at least one of the contribution metrics corresponding to the asset classes;
- calculating a tuned importance score for each of the entity records based on the tuning-input from the user; and
- identifying the key entity records required by the user based on the tuned importance scores of the entity records.

The present disclosure provides the system and the method of managing key entity records required by the user. The present disclosure enables a real-time evaluation of performances of the entities corresponding to the plurality of entity attributes thereof. Such real-time evaluation facilitates a continuous monitoring of performance of entities. Additionally, such structured entity records further provides a reliable and accurate way of identifying key entity records processed from data records. Furthermore, the present disclosure enables customization of identified key entity records according to requirement of the user.

The computer system relates to at least one computing unit comprising a central storage system, processing units and various peripheral devices. Optionally, the computer system relates to an arrangement of interconnected computing units, wherein each computing unit in the computer system operates independently and may communicate with other external devices and other computing units in the computer system.

The term "system that manages" is used interchangeably with the term "system for managing", wherever appropriate i.e. whenever one such term is used it also encompasses the other term.

Moreover, the present disclosure provides a system that is operable to identify key entities without the requirement of frequent human intervention for its functioning and regularly updating the recent accomplishments in the field of interest of the user. Beneficially, an automated system with less frequent human intervention reduces any chances for biased or manipulated results. Additionally, such automated system results in time-efficient managing of the key entity records required by the user. Furthermore, the present system described herein is simple, reliable, cost-effective and efficient.

Throughout the present disclosure, the term "entity" as used herein, refers to one or more persons, organizations, objects, domains and so forth. For example, entity may include a researcher, marketing influential, physician and so forth. Furthermore, the entity may be an expert in a specific domain of the industry and required for launching or promoting a new service or product. Moreover, the entities may play a key role in providing such expertise. Furthermore, it may be beneficial to acquire such expertise from a key entity. For example, marketing influential people play a key role in influencing people's opinion of a product or service. Specifically, the key entity may refer to an entity that may be an expert in domain of the industry required by a user. Furthermore, there may be multiple key entities present related to the specific domain. However, some of the key entities may be of higher interest to the user depending on the expertise of such key entities in the domain of the industry required by the user.

Throughout the present disclosure, the term "entity records" refers to the information related to the entities. Furthermore, the information in the entity records may include data in form of tables, maps, grids, packets, files, documents, lists or in any other form. Moreover, the entity records comprise entity names and plurality of entity attributes associated with the entity names. Specifically, the entity records comprise structured and relevant information related to the entity. Furthermore, each of the entity records comprises an entity name and plurality of entity attributes. Specifically, the terms "entity name" and "plurality of entity attributes" relate to subject of information included in the entity records. Specifically, the entity record includes information related to the entity name. Furthermore, the entity names may belong to one or more persons, organizations, objects, domains and so forth. Moreover, the entity records include fields of information about the entity names. Specifically, the fields of information about the entity names are the plurality of entity attributes. Additionally, the plurality of entity attributes may include data related to the further information about the achievements of entity in its domain. For example, the plurality of entity attributes may include information regarding correspondence address, academic background, birthdate, research work, publications and so forth.

Furthermore, the existing data records may be structured to obtain the entity records. Optionally, the entity records may be in tabular form. Additionally, first cell in a column may include the entity name and remaining cells in the column may include the plurality of entity attributes.

Throughout the present disclosure, the term "database arrangement" used herein, relates to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. Furthermore, the data storage and systems may include MongoDB, HBase, ElasticSearch, Neo4J, ArangoDB and so forth. Additionally, the database arrangement refers to the software program for creating and managing one or more databases. Optionally, the database arrangement may be operable to support relational operations, regardless of whether it enforces strict adherence to the relational model, as understood by those of ordinary skill in the art. Moreover, the database arrangement is operable to store the structured database comprising entity records. Optionally, the database arrangement is operable to store the existing data sources.

Throughout the present disclosure, the term "structured database" as used herein, refers to a repository of information related to the entities. Specifically, the structured database comprises information related to the various entities arranged in a structured manner. More specifically, the structured database is obtained from structuring the data-records from the existing data sources. Further, more specifically, the structured database comprises entity records required by a user.

The processing module is communicably coupled to the database arrangement. Throughout the present disclosure, the term "processing module" used herein relates to a computational element that is operable to respond to and process instructions that carry out the method. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processing module" may refer to one or more individual processors, processing devices and various elements associated with a processing device that may be shared by other processing devices. Additionally, the one or more individual processors, processing devices and elements are arranged in various architectures for responding to and processing the instructions that drive the system. Optionally, the processing module is operatively coupled to the communication module. Consequently, the coupling of processing module and communication module enables an exchange of data between the database arrangement and the processing module. In an example, the communication module includes but not limited to, a cellular network, short range radio (for example, such as Bluetooth®), Internet, a wireless local area network, and an Infrared Local Area Network, or any combination thereof.

The processing module is operable to receive the structured database, comprising entity records, wherein each of the entity records comprises an entity name and plurality of entity attributes. Specifically, the entity records provide information related to the entities. The processing module is operable to use the entity records stored within the structured database for managing the key entity records required by the user related to a specific domain of interest to the user. In an example, the structured database may comprise entity records for various marketing influential entities, with entity names "John Lewis", "Jessica Parker", "Jane Miller", and so forth. The entity records further comprise a plurality of entity attributes corresponding to each entity names, such as number of research articles published by the entity, congresses attended, institutions the entity is associated with, and so forth.

In an embodiment, the processing module is operable to develop the structured database. Specifically, the structured database is developed by crawling the existing data sources to extract data-records. More specifically, the processing module is operable to crawl the existing data sources to extract data-records. Furthermore, crawling the existing data sources may include extracting data from the available public or internal sources. Moreover, the crawled existing data sources may include information based on the research work or the publication data made available on the internet (namely, social networking sites, blogs, news) or several internal sources (namely, the institute or company websites).

Throughout the present disclosure, the term "existing data sources" relates to organized or unorganized bodies of digital information regardless of manner in which data is represented therein. Furthermore, the existing data sources may be made available from public or available internal sources. Furthermore, the public or available internal sources may include social networking sites, blogs, news, institutes, government agencies, market surveys and so forth. However, the existing data sources may include one or more data-records for the entity that may be related to another person.

Moreover, the processing module is operable to develop the structured database by structuring the extracted data-records to obtain entity records, wherein each of the entity records comprises an entity name and plurality of entity attributes. Moreover, the data records from the existing data sources may be scattered, repetitive, inconsistent and/or missing values. Therefore, it may be beneficial to develop a structured database comprising entity records. Furthermore, the structured database may include all the data-records crawled from the existing data sources in an organized manner in the format of entity records.

Optionally, the processing module is further operable develop the structured database by tagging each of the plurality of entity attributes with one of the asset classes. The term "asset classes" relates to a category that one or more entity attributes may be assigned in. Examples of the asset classes may include, but are not limited to, research papers, publications, clinical trials, congresses, guidelines, regulatory bodies, societies, advocacy, top hospital association. Specifically, an entity attribute with information about a publication associated with an entity may be tagged with the asset class "publication". More specifically, an entity attribute with information about clinical trial conducted by the entity may be tagged with the asset class "clinical trials". Additionally, each of plurality of entity attributes is tagged with at least one asset class. Furthermore, at least one tagged asset class with an entity attribute may provide information about the type of information included in the entity attribute.

Optionally, developing the structured database further comprises identifying a field of each of the entity records based on at least one of the plurality of entity attributes of the entity record. More optionally, the processing module is operable to identify the field of each of the entity records based on at least one of the plurality of entity attributes of the entity record. Specifically, the term "field" refers to a domain or an area of expertise of the entity records. For example, the field of the entity record may include chemistry, marketing, medicine, oncology, and so forth. Furthermore, the field of the entity record is identified based on the at least one of the plurality of entity attributes of the entity record. In an example, an entity may comprise entity attributes comprising information about clinical trials conducted by the entity and a society the entity is associated with. In such example, the entity attribute comprising information about clinical trials conducted by the entity may be for a drug against ovarian cancer "CVac", and the entity attribute comprising information about society the entity is associated with may be "National Cancer Research Association". Therefore, in such example, the field of the entity may be identified as "oncology" from the entity attributes of the entity record.

Optionally, the processing module is operable to receive a field-input from the user, wherein the entity records are filtered based on the field-input prior to determining the importance scores of the entity records. Specifically, the field-input is based on identified fields of the entity records. More specifically, the processing module may compile the identified fields in a list. Consequently, such list of fields may be presented to the user and the user may provide the field-input as a selection of a field from the list of fields. Subsequently, the entity records required by the user are filtered based on the field-input from the user.

The processing module is operable to determine the importance score for each of the entity records, wherein the importance score for a given entity record is determined based upon the plurality of entity attributes thereof. Throughout the present disclosure, the term "importance score" as used herein, relates to an individual score of each of the entity records required by the user. More specifically, plurality of entity attributes may be analysed to determine a significance thereof. Therefore, such significance of the plurality of entity attributes may influence the importance score. Furthermore, the importance score of an entity record is determined based on each of the plurality of entity attributes belonging to asset classes.

Furthermore, each of the asset classes comprising the plurality of entity attributes of the given entity record has a corresponding predefined contribution metric towards the importance score of the given entity record. The term "contribution metric" relates to a weightage assigned to for each of the asset classes. Specifically, the contribution metric of a given asset class is a weightage assigned to the given asset class to determine the contribution of entity attributes in the given asset class towards the importance score. More specifically, each asset class contribute a certain percentage towards the calculation of the importance score of the entity record. The contribution metric of each of the asset classes comprising the plurality of entity attributes of the given entity record may sum up to 100%. The contribution metric may be used to calculate a percentile contribution of each of the asset classes in determining the importance score of the entity. Furthermore, the contribution metric is predefined, wherein each of the asset class is pre-assigned a weightage thereto. For example, a predefined contribution metric corresponding to each of the asset classes mentioned previously may be 15% for research papers, 10% for publications, 20% for clinical trials, 15% for congresses, 5% for guidelines, 10% for regulatory bodies, 10% for societies, 10% for advocacy, and 5% for top hospital KOLs, all summing up to 100% contribution to the importance score of the entity. It will be appreciated that entity attributes of an asset class with a higher contribution metric may have a higher influence on the importance score in comparison with entity attributes of an asset class with a lower contribution metric.

In an exemplary implementation, importance scores of three entity records are calculated based on the plurality of entity attributes thereof as illustrated in Table 1. Furthermore, the three entity records have entity names "John", "Jessica" and "Liam". Additionally, the plurality of entity attributes of each of the three entity records belong to asset classes, "Publications", "Research Papers", "Congresses", "Clinical Trials" and "Societies". Optionally, a sub-importance score for each of the asset classes may be determined; and sub-importance scores of the asset classes may be aggregated to obtain the importance score. Moreover, the sub-importance score of an asset class is determined based on the percentile calculation using the contribution metric, wherein the highest sub-importance score is assigned to the entity record with highest value of plurality of entity attributes in the asset class. For example, for the asset class "Publications" with predefined contribution metric of 15, the entity record "Liam" has the highest value of entity attributes in comparison with the entity records "John" and "Jessica". Therefore, the sub-importance score of the asset class "Publications" for entity record "Liam" is 15. Similarly, the sub-importance score of the asset class "Publications" for entity record "John" and "Jessica" are calculated. As shown in the Table 1, a number of entity attributes are shown, for each entity record, corresponding to the asset class thereof; and a sub-importance score of the asset class for the given entity record is shown in the parentheses. For example, number of entity attributes for entity record "Jessica" for asset class "Research Papers" is 15; and a sub-importance score of the asset class "Research Papers" for the entity record "Jessica" is 20, as shown in the parentheses.

TABLE 1

| Asset Classes | Contribution Metric (%) | John | Jessica | Liam |
|---|---|---|---|---|
| Publications | 15 | 2 (3.7) | 5 (9.4) | 8 (15) |
| Research Papers | 20 | 10 (13.3) | 15 (20) | 5 (6.6) |
| Congresses | 20 | 5 (20) | 2 (8) | 3 (12) |
| Clinical Trials | 30 | 10 (30) | 6 (18) | 8 (24) |
| Societies | 15 | 2 (5) | 3 (7.5) | 6 (15) |
| Total | 100 | 72 | 62.9 | 72.6 |

It may be noted that the entity record "Liam" has the highest importance score, while "John" and "Jessica" have lower importance scores in comparison with "Liam".

The processing module is operable to identify key entity records based on the determined importance scores of the entity records. Specifically, the entity records with higher importance scores are identified as key entity records. Moreover, a higher importance score signifies a higher expertise and influence of the entity and thus are identifies as key entity records. Furthermore, in an example, entity records may be displayed in a list, arranged in order of decreasing importance scores, wherein the user may consider the entity records at a higher position in the list as key entity records.

The predefined contribution metric corresponding to each of the asset classes may be tuned (namely, tweaked, altered, adjusted) by the user as per the entity records required by the user. Specifically, asset classes may be assigned a tuned contribution score based on the requirement of the user in identifying key entities. More specifically, tuning the contribution metric of the asset classes alters the arrangement of the various key entities, in the output page of the graphical user interface, based on the change in the importance score of the key entity record. Moreover, tuning the contribution metric of the asset classes may identify new entity records as key entity records that were previously not identified as key entity records.

Furthermore, the processing module is operable to receive a tuning-input from the user, wherein the tuning-input is operable to adjust at least one of the contribution metrics corresponding to the asset classes. The "tuning-input" relates to the user-enabled adjustment of the predefined contribution metric corresponding to the asset classes. It will be appreciated that the contribution metric corresponding to the asset classes may be tuned to give different weightage to asset classes, wherein different weightages may result in different importance score for the entity records.

The processing module is operable to calculate the tuned importance score for the entity records, based on the tuning-input from the user. The "tuned importance score" of a given entity record relates to an individual score of the given entity record, calculated based on the tuning-input from the user. Specifically, each of the asset classes comprising the plurality of entity attributes of the given entity record may be tuned to provide a tuned contribution metric (obtained by tuning-input received from the user) contributing towards the tuned importance score of the given entity record. More specifically, the tuned contribution metric of each of the asset classes comprising the plurality of entity of the given entity record sums up to 100% contribution to the tuned importance score of the entity.

Referring to the exemplary implementation as illustrated in Table 1, a tuning-input from the user is received, wherein contribution metric of each of the asset classes "Publications", "Research Papers", "Congresses", "Clinical Trials", "Societies" is adjusted to 10%, 25%, 30%, 25% and 10% respectively. It may be noted that the tuning-input from the user influences a change in the importance score to obtain tuned importance score of 77.3, 72 and 68.3 for "John", "Jessica" and "Liam" respectively. Furthermore, the entity record "John" has the highest tuned importance score.

TABLE 2

| Asset Classes | Contribution Metric (%) | John | Jessica | Liam |
| --- | --- | --- | --- | --- |
| Publications | 10 | 2 (2.5) | 5 (6.2) | 8 (10) |
| Research Papers | 25 | 10 (16.6) | 15 (25) | 5 (8.3) |
| Congresses | 30 | 5 (30) | 2 (12) | 3 (18) |
| Clinical Trials | 25 | 10 (25) | 6 (15) | 8 (20) |
| Societies | 10 | 2 (3.2) | 3 (4.8) | 6 (10) |
| Total | 100 | 77.3 | 73 | 68.3 |

The processing module is operable to identify the key entity records required by the user based on the tuned importance scores of the entity records. Specifically, the tuned importance scores of the entity records are used to identify the key entity records required by the user. More specifically, the entity records with the higher tuned importance score are identified as the key entity records.

Optionally, the plurality of entity attributes of each of the entity records are time-stamped. Specifically, each of the entity attributes has a time associated therewith. In an example, an entity attribute in the asset class "Research Papers" may have the date of publication of the entity attribute as the time-stamp. Similarly, such time-stamps of each of the plurality of entity attributes of a given entity record are obtained.

Optionally, the processing module is operable to receive a time-range-input from the user, wherein the importance score of a given entity record is based on the entity attributes with time-stamps in the time-range. Specifically, the processing module is operable to determine the importance score of the entity records based on the entity attributes with time-stamps in the range of time-range-input.

The present disclosure also relates to the method as described above. Various embodiments and variants disclosed above apply mutatis mutandis to the method.

Optionally, the method comprises receiving a field-input from the user, wherein the entity records are filtered based on the field-input prior to determining the importance scores of the entity records.

Optionally, the method comprises developing the structured database by:
 crawling existing data sources to extract data-records;
 structuring the extracted data-records to obtain entity records, wherein each of the entity records comprises an entity name and plurality of entity attributes;
 tagging each of the plurality of entity attributes with one of the asset classes; and
 identifying a field of each of the entity records based on at least one of the plurality of entity attributes of the entity record.

Optionally, the plurality of entity attributes of each of the entity records are time-stamped.

More optionally, the method further comprises receiving a time-range-input from the user, wherein the importance score of a given entity record is based on the entity attributes with time-stamps in the time-range.

Furthermore, there is disclosed a computer readable medium, containing program instructions for execution on a computer system, which when executed by a computer, cause the computer to perform method steps for managing key entity records required by a user. The method comprises the steps of providing a structured database comprising entity records, wherein each of the entity records comprises an entity name and plurality of entity attributes, further wherein the plurality of entity attributes belong to asset classes; determining an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record; identifying key entity records based on the determined importance scores of the entity records; receiving a tuning-input from the user, wherein the tuning-input is operable to adjust at least one of the contribution metrics corresponding to the asset classes; calculating a tuned importance score for each of the entity records based on the tuning-input from the user; and identifying the key entity records required by the user based on the tuned importance scores of the entity records.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated is a block diagram of a system 100 that manages key entity records required by a user, in accordance with an embodiment of the present disclosure. The system 100 comprises a database arrangement 102 operable to store a structured database comprising entity records; and a processing module 104 communicably coupled to the database arrangement 102. The processing module 104 is operable to identify the key entity records required by the user based on tuned importance scores of the entity records.

Figure 2:
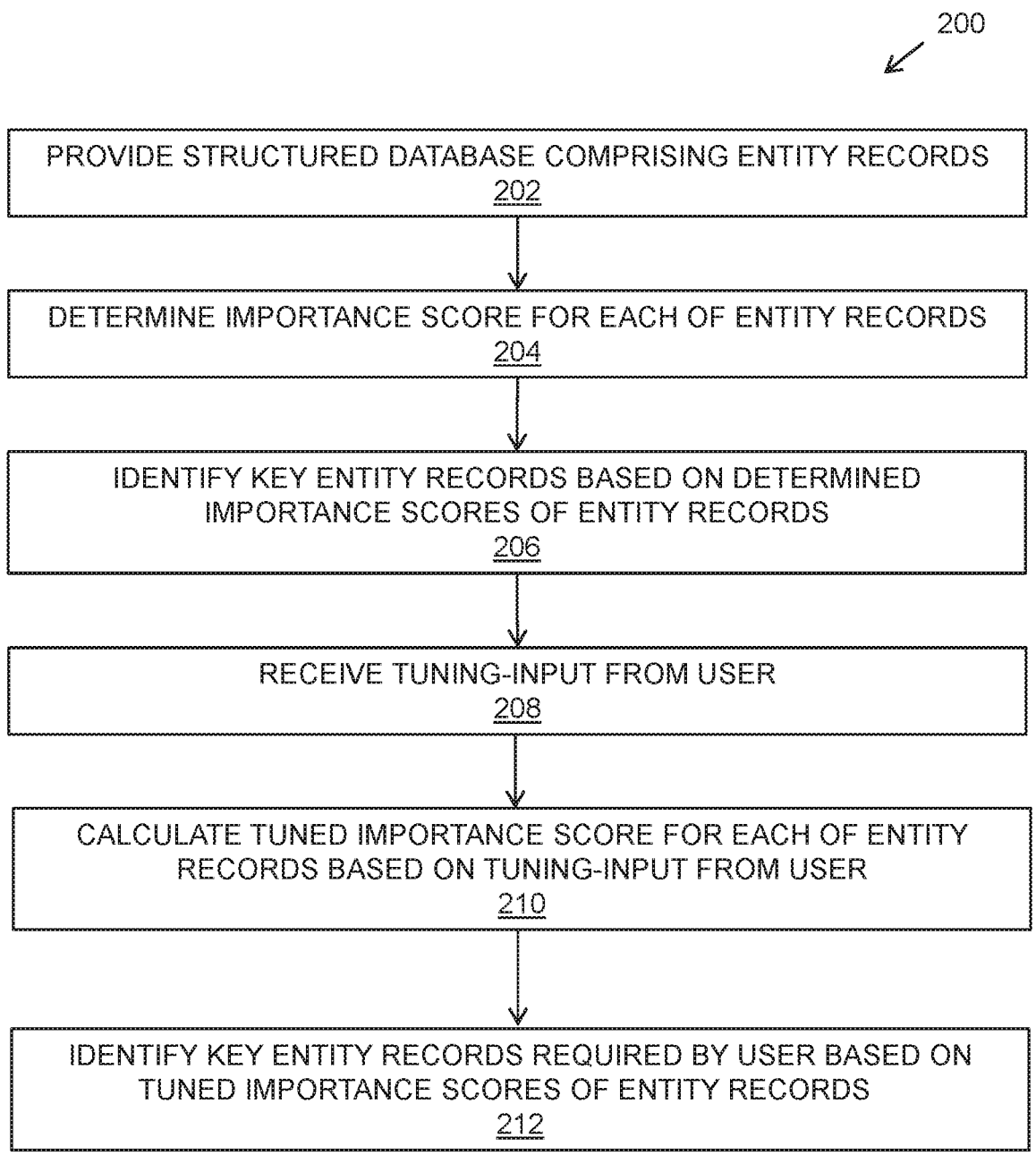
FIG. 2 is an illustration of steps of a method of managing key entity records required by a user, in accordance with an embodiment of the present disclosure.

Referring to FIG. 2, illustrated is an illustration of steps of a method 200 of managing key entity records required by a user, in accordance with an embodiment of the present disclosure. At a step 202, a structured database comprising entity records is provided. Furthermore, each of the entity records comprises an entity name and plurality of entity attributes. Moreover, the plurality of entity attributes belong to asset classes. At a step 204, an importance score for each of the entity records is determined. Additionally, the importance score for a given entity record is determined based upon the plurality of entity attributes thereof. Moreover, each of the asset classes comprising the plurality of entity attributes of the given entity record has a corresponding predefined contribution metric towards the importance score of the given entity record. At a step 206, key entity records are identified based on the determined importance scores of the entity records. At a step 208, a tuning-input from the user is received. Furthermore, the tuning-input is operable to adjust at least one of the contribution metrics corresponding to the asset classes. At step 210, a tuned importance score for each of the entity records is calculated based on the tuning-input from the user. At step 212, the key entity records required by the user are identified based on the tuned importance scores of the entity records.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system that manages key entity records required by a user, wherein the system comprises:
   a database arrangement operable to store a structured database comprising entity records; and
   a computer system comprising a memory and a processor communicably coupled to the database arrangement, the processor being operable to:
      receive the structured database comprising entity records, wherein each of the entity records comprises an entity name and plurality of entity attributes, further wherein the plurality of entity attributes belong to asset classes;
      determine an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record;
      identify key entity records based on the determined importance scores of the entity records;
      receive a tuning-input from the user, wherein the tuning-input is operable to adjust at least one of the contribution metrics corresponding to the asset classes;
      calculate a tuned importance score for each of the entity records based on the tuning-input from the user; and
      identify the key entity records required by the user based on the tuned importance scores of the entity records;
   wherein the processor is further operable to develop the structured database by:
      crawling existing data sources to extract data-records;
      structuring the extracted data-records to obtain entity records, wherein each of the entity records comprises an entity name and plurality of entity attributes;
      tagging each of the plurality of entity attributes with one of the asset classes; and
      identifying a field of each of the entity records based on at least one of the plurality of entity attributes of the entity record.

2. The system of claim 1, wherein the processor is operable to receive a field-input from the user, wherein the entity records are filtered based on the field-input prior to determining the importance scores of the entity records.

3. The system of claim 1, wherein the plurality of entity attributes of each of the entity records are time-stamped.

4. The system of claim 3, wherein the processor is further operable to receive a time-range-input from the user, wherein the importance score of a given entity record is based on the entity attributes with time-stamps in the time-range.

5. A method of managing key entity records required by a user, wherein the method includes using a computer system, wherein the method comprises using a processor of the computer system to:
   provide a structured database comprising entity records, wherein each of the entity records comprises an entity name and plurality of entity attributes, further wherein the plurality of entity attributes belong to asset classes;
   determine an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record;
   identify key entity records based on the determined importance scores of the entity records;
   receive a tuning-input from the user, wherein the tuning-input is operable to adjust at least one of the contribution metrics corresponding to the asset classes;
   calculate a tuned importance score for each of the entity records based on the tuning-input from the user;
   identify the key entity records required by the user based on the tuned importance scores of the entity records; and
   develop the structured database by:
      crawling existing data sources to extract data-records;
      structuring the extracted data-records to obtain entity records, wherein each of the entity records comprises an entity name and plurality of entity attributes;
      tagging each of the plurality of entity attributes with one of the asset classes; and
      identifying a field of each of the entity records based on at least one of the plurality of entity attributes of the entity record.

6. The method of claim 5, wherein the method comprises receiving a field-input from the user, wherein the entity records are filtered based on the field-input prior to determining the importance scores of the entity records.

7. The method of claim 5, wherein the plurality of entity attributes of each of the entity records are time-stamped.

8. The method of claim 7, wherein the method further comprises receiving a time-range-input from the user, wherein the importance score of a given entity record is based on the entity attributes with time-stamps in the time-range.

9. A non-transitory computer readable storage medium, containing program instructions for execution on a computer system, which when executed by a computer, cause the computer to perform method steps for managing key entity records required by a user, the method comprising the steps of:
   providing a structured database comprising entity records, wherein each of the entity records comprises an entity name and plurality of entity attributes, further wherein the plurality of entity attributes belong to asset classes;
   determining an importance score for each of the entity records, wherein the importance score for a given entity record is determined based upon the plurality of entity attributes thereof, further wherein each of the asset classes comprising the plurality of entity attributes of the given entity record has a corresponding predefined contribution metric towards the importance score of the given entity record;

identifying key entity records based on the determined importance scores of the entity records;

receiving a tuning-input from the user, wherein the tuning-input is operable to adjust at least one of the contribution metrics corresponding to the asset classes;

calculating a tuned importance score for each of the entity records based on the tuning-input from the user; and identifying the key entity records required by the user based on the tuned importance scores of the entity records;

wherein the processor is further operable to develop the structured database by:

crawling existing data sources to extract data-records;

structuring the extracted data-records to obtain entity records, wherein each of the entity records comprises an entity name and plurality of entity attributes;

tagging each of the plurality of entity attributes with one of the asset classes; and identifying a field of each of the entity records based on at least one of the plurality of entity attributes of the entity record.

* * * * *